United States Patent
San (10) Patent No.: US 11,270,151 B2
(45) Date of Patent: Mar. 8, 2022

(54) METHOD AND IMAGE PROCESSING CIRCUIT FOR PERFORMING SEARCHING OPERATIONS REGARDING IMAGES

(71) Applicant: Realtek Semiconductor Corp., HsinChu (TW)

(72) Inventor: Guangyu San, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 17 days.

(21) Appl. No.: 16/889,824

(22) Filed: Jun. 2, 2020

(65) Prior Publication Data

US 2021/0295086 A1  Sep. 23, 2021

(30) Foreign Application Priority Data

Mar. 23, 2020 (CN) .......................... 202010209259.2

(51) Int. Cl.
*G06K 9/46*  (2006.01)

(52) U.S. Cl.
CPC ......... *G06K 9/4642* (2013.01); *G06K 9/4609* (2013.01)

(58) Field of Classification Search
CPC ........... G06T 2207/10016; G06T 7/223; G06T 7/231; H04N 19/139; H04N 19/56; H04N 19/583; H04N 19/593; H04N 5/145
See application file for complete search history.

(56) References Cited

U.S. PATENT DOCUMENTS

2002/0009144 A1\* 1/2002 Ishihara .................. G06T 7/231
 375/240.16
2019/0158844 A1\* 5/2019 Wang .................. H04N 19/176

FOREIGN PATENT DOCUMENTS

TW           I355614         1/2012

OTHER PUBLICATIONS

Jong-Nam Kim, Tae-Sun Choi, "A Fast Full-Search Motion-Estimation Algorithm Using Representative Pixels and Adaptive Matching Scan", Oct. 2000, IEEE, USA.

\* cited by examiner

*Primary Examiner* — Ross Varndell
(74) *Attorney, Agent, or Firm* — Winston Hsu (57) ABSTRACT

A method and image processing circuit for performing searching operations regarding an image are provided, wherein the image includes a plurality of blocks. The method includes: utilizing a grouping circuit to divide the plurality of blocks into a plurality of groups, wherein a group within the plurality of groups corresponds to a searching region within a target image, the group includes $N_B$ reference blocks within the plurality of blocks, the searching region includes $N_B$ sub-regions, and $N_B$ is an integer greater than one; utilizing a searching circuit to search for the $N_B$ reference blocks in the $N_B$ sub-regions, respectively, to generate $N_B$ searching results respectively corresponding to the $N_B$ reference blocks; and utilizing a selecting circuit to select a searching result from the $N_B$ searching results, for utilizing the searching result to represent a portion or all of the $N_B$ searching results.

14 Claims, 8 Drawing Sheets

METHOD AND IMAGE PROCESSING CIRCUIT FOR PERFORMING SEARCHING OPERATIONS REGARDING IMAGES

BACKGROUND OF THE INVENTION

1. Field of the Invention

The present invention is related to image processing, and more particularly, to a method and image processing circuit for performing searching operations regarding an image.

2. Description of the Prior Art

In image processing, searching operations are usually required. For operations regarding a comparison of two images, conventional methods usually need to perform the comparison many times, which uses a significant amount of hardware resources. Thus, there is a need for a novel searching method and associated architecture which can reduce searching operations required for image processing, thereby also reducing hardware costs.

SUMMARY OF THE INVENTION

An objective of the present invention is to provide a method and an image processing circuit for performing searching operations regarding an image, which can reduce the number of searching operations required for image processing without introducing any side effect or in a way that is less likely to introduce side effects.

Another objective of the present invention is to provide a method and an image processing circuit for performing searching operations regarding an image, which can enhance an overall performance of image processing.

At least one embodiment of the present invention provides a method for performing searching operations regarding an image, wherein the image comprises a plurality of blocks, and each block within the plurality of blocks comprises a plurality of pixels. The method may comprise: utilizing a grouping circuit to divide the plurality of blocks into a plurality of groups, wherein a group within the plurality of groups corresponds to a searching region within a target image, the group comprises $N_B$ reference blocks within the plurality of blocks, the searching region comprises $N_B$ sub-regions, and $N_B$ is an integer greater than one; utilizing a searching circuit to search for the $N_B$ reference blocks in the $N_B$ sub-regions, respectively, to generate $N_B$ searching results respectively corresponding to the $N_B$ reference blocks; and utilizing a selecting circuit to select a searching result from the $N_B$ searching results according to $N_B$ matching indicators respectively corresponding to the $N_B$ searching results, for utilizing the searching result to represent a portion or all of the $N_B$ searching results.

At least one embodiment of the present invention provides an image processing circuit for performing searching operations regarding an image, wherein the image comprises a plurality of blocks, and each block within the plurality of blocks comprises a plurality of pixels. The image processing circuit may comprise a grouping circuit, a searching circuit coupled to the grouping circuit, and a selecting circuit coupled to the searching circuit. In operations of the image processing circuit, the grouping circuit may be configured to divide the plurality of blocks into a plurality of groups, wherein a group within the plurality of groups corresponds to a searching region within a target image, the group comprises $N_B$ reference blocks within the plurality of blocks, the searching region comprises $N_B$ sub-regions, and $N_B$ is an integer greater than one; the searching circuit may be configured to search for the $N_B$ reference blocks in the $N_B$ sub-regions, respectively, to generate $N_B$ searching results respectively corresponding to the $N_B$ reference blocks; and the selecting circuit may be configured to select a searching result from the $N_B$ searching results according to $N_B$ matching indicators respectively corresponding to the $N_B$ searching results, for utilizing the searching result to represent a portion or all of the $N_B$ searching results.

The method and the image processing circuit provided by embodiments of the present invention can effectively reduce the number of searching operations to thereby reduce hardware requirements (e.g. circuit area, power consumption, etc.). Thus, in comparison with the related art, the present invention can enhance the overall performance of image processing without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
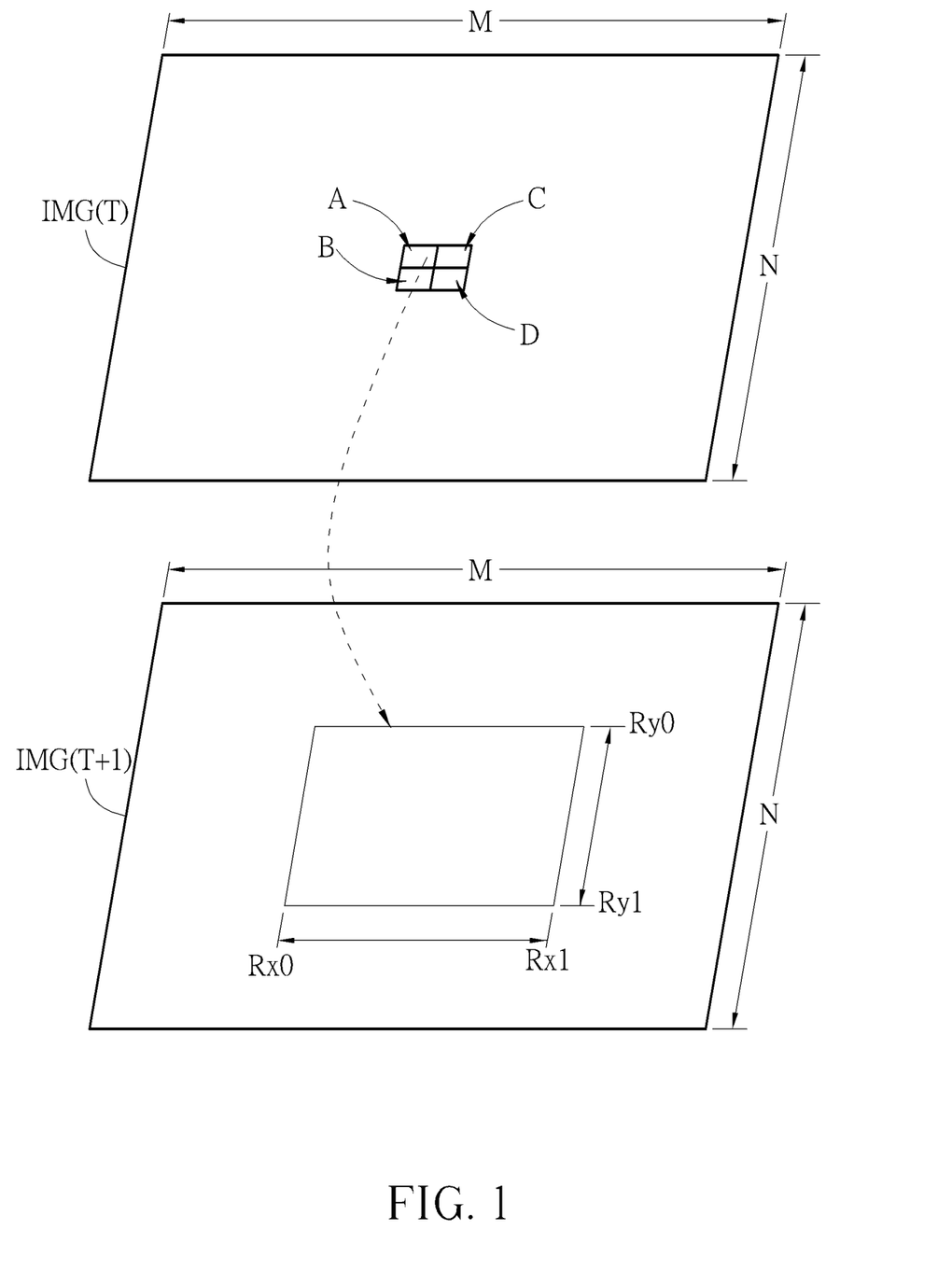
FIG. 1 is a diagram illustrating a searching operation regarding a first block within an image according to an embodiment of the present invention.
Figure 2:
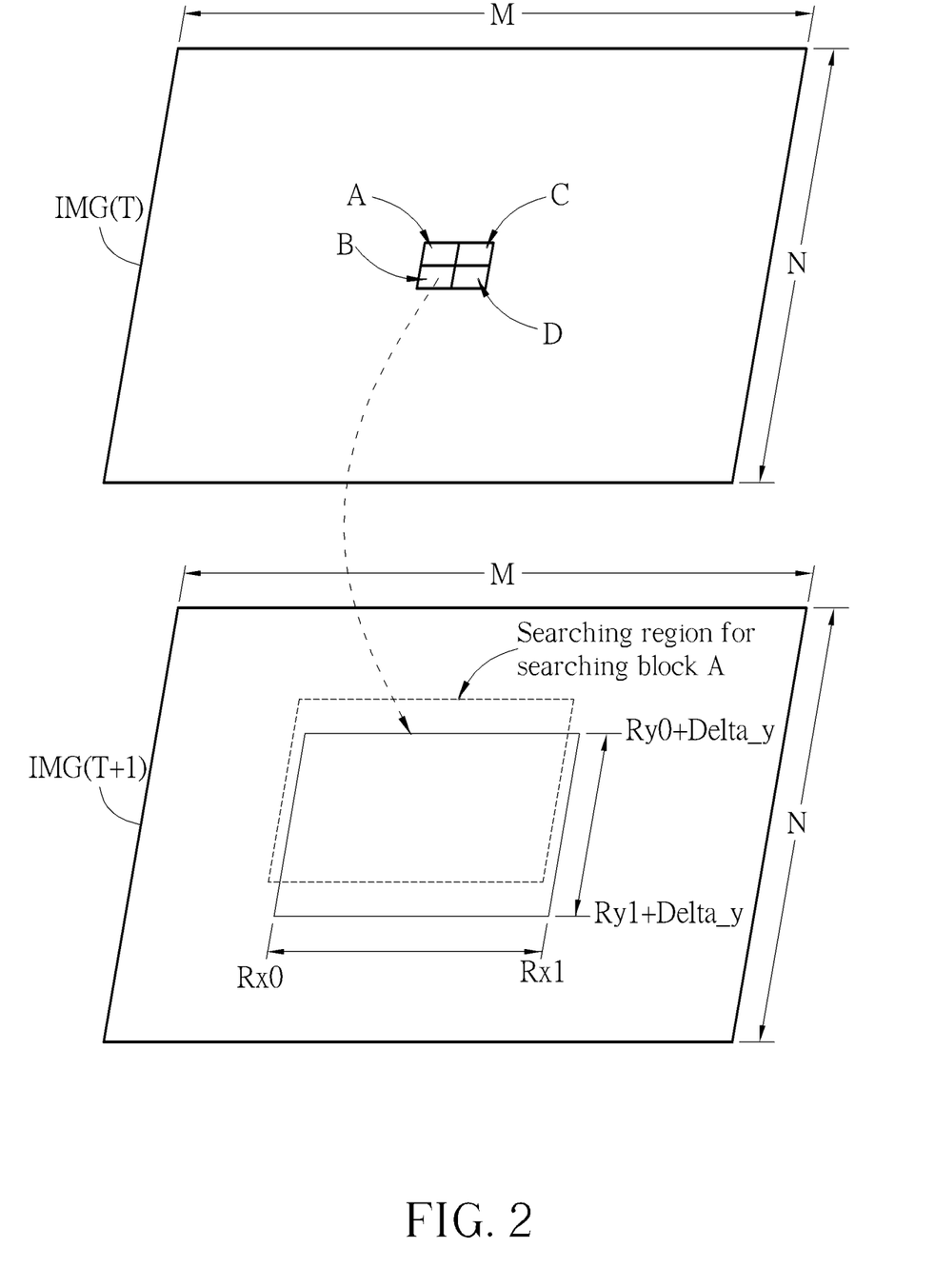
FIG. 2 is a diagram illustrating a searching operation regarding a second block within an image according to an embodiment of the present invention.
Figure 3:
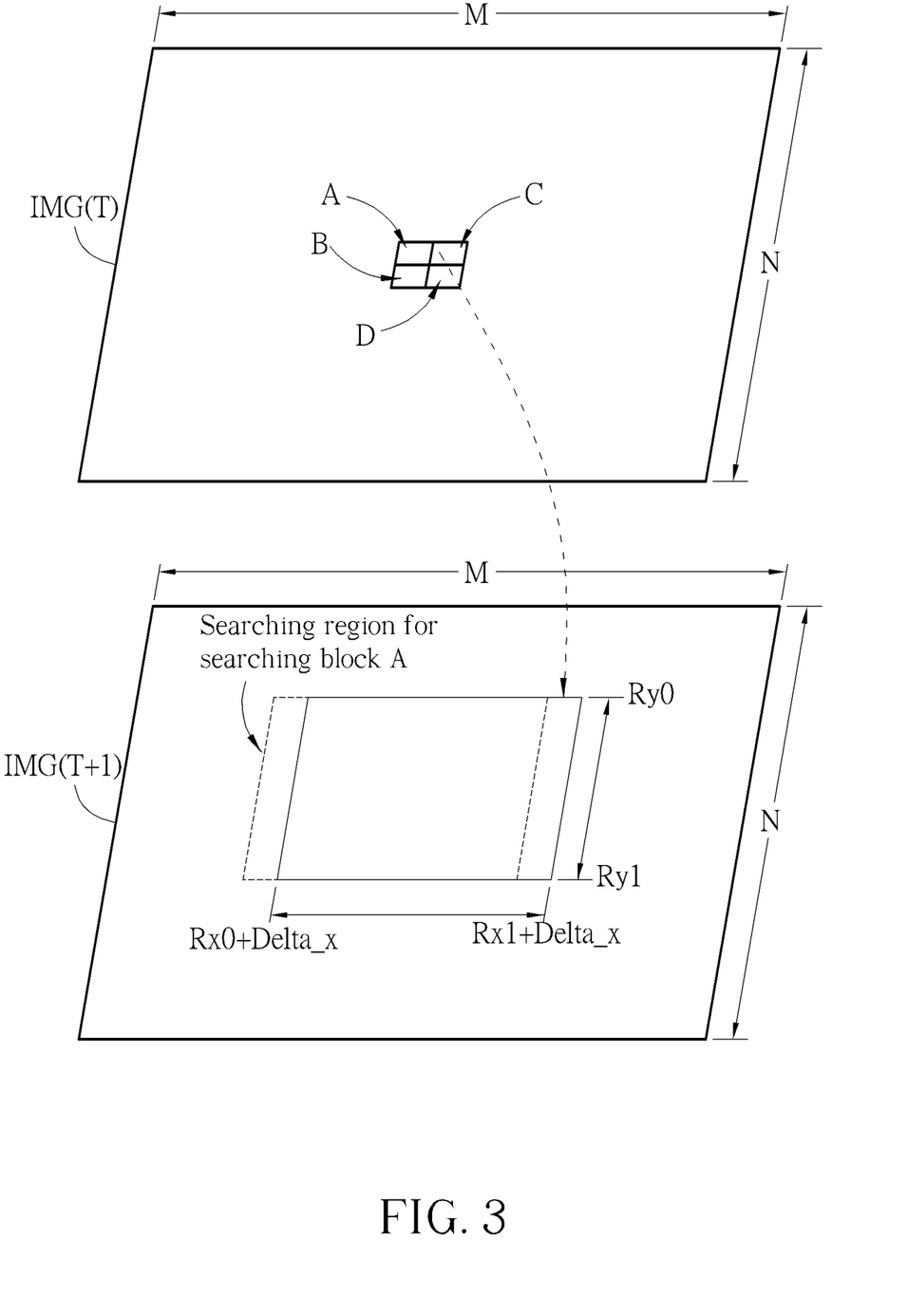
FIG. 3 is a diagram illustrating a searching operation regarding a third block within an image according to an embodiment of the present invention.
Figure 4:
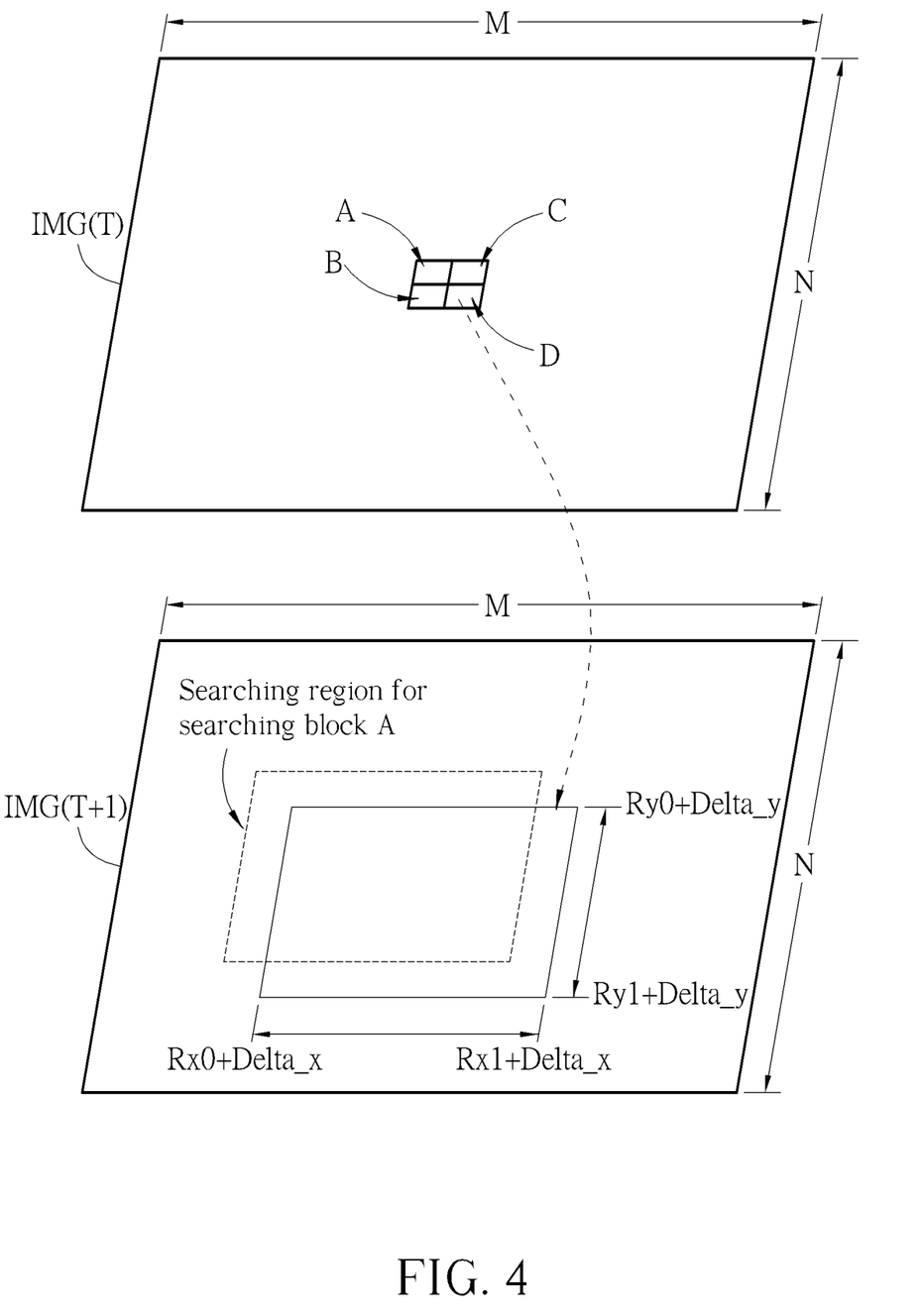
FIG. 4 is a diagram illustrating a searching operation regarding a fourth block within an image according to an embodiment of the present invention.

In some embodiments, a full-search is applicable to a comparison of two images. For example, images IMG(T) and IMG(T+1) may represent an image of a $T^{th}$ frame and an image of a $(T+1)^{th}$ frame, where T is a positive integer. More particularly, each of the images IMG(T) and IMG(T+1) may comprise a plurality of blocks, and each block within the plurality of blocks may comprise a plurality of pixels. For example, each of the images IMG(T) and IMG(T+1) may comprise M×N blocks. If a searching operation regarding each block within the M×N blocks requires K comparison operations (or an average number of comparison operations required by the searching operation regarding each block is K), searching operations regarding a whole image may totally require M×N×K comparison operations, where M, N and K are positive integers greater than one. For example, blocks A, B, C and D are four adjacent blocks within the plurality of blocks of the image IMG(T), as shown in FIG. 1 to FIG. 4. FIG. 1 is a diagram illustrating a searching operation regarding the block A within the image IMG(T) according to an embodiment of the present invention, wherein the searching operation may be searching for a block corresponding to the block A in the image IMG(T+1); FIG. 2 is a diagram illustrating a searching operation regarding the block B within the image IMG(T) according to an embodiment of the present invention, wherein the searching operation may be searching for a block corresponding to the block B in the image IMG(T+1); FIG. 3 is a diagram illustrating a searching operation regarding the block C within the image IMG(T) according to an embodiment of the present invention, wherein the searching operation may be searching for a block corresponding to the block C in the image IMG(T+1); and FIG. 4 is a diagram illustrating a searching operation regarding the block D within the image IMG(T) according to an embodiment of the present invention, wherein the searching operation may be searching for a block corresponding to the block D in the image IMG(T+1). For example, a searching region configured to search for the block A in the image IMG(T+1) is positioned on a region covered by a $Rx0^{th}$ column to a $Rx1^{th}$ column of pixels and a $Ry0^{th}$ row to a $Ry1^{th}$ row of pixels, as shown in FIG. 1; a searching region configured to search for the block B in the image IMG(T+1) is positioned on a region covered by the $Rx0^{th}$ column to the $Rx1^{th}$ column of pixels and a $(Ry0+Delta\_y)^{th}$ row to a $(Ry1+Delta\_y)^{th}$ row of pixels, as shown in FIG. 2; a searching region configured to search for the block C in the image IMG(T+1) is positioned on a region covered by a $(Rx0+Delta\_x)^{th}$ column to a $(Rx1+Delta\_x)^{th}$ column of pixels and the $Ry0^{th}$ row to the $Ry1^{th}$ row of pixels, as shown in FIG. 3; and a searching region configured to search for the block D in the image IMG(T+1) is positioned on a region covered by the $(Rx0+Delta\_x)^{th}$ column to the $(Rx1+Delta\_x)^{th}$ column of pixels and the $(Ry0+Delta\_y)^{th}$ row to the $(Ry1+Delta\_y)^{th}$ row of pixels, as shown in FIG. 4; where Rx0, Rx1, Ry0, Ry1, Delta_x and Delta_y are positive integers greater than one, but the present invention is not limited thereto. If searching for the block A in the region covered by the $Rx0^{th}$ column to the $Rx1^{th}$ column of pixels and the $Ry0^{th}$ row to the $Ry1^{th}$ row of pixels of the image IMG(T+1) requires K comparison operations, searching for the blocks A, B, C and D totally requires K×4 comparison operations. For better comprehension, the searching region configured to search for the block A is also illustrated in FIG. 2, FIG. 3 and FIG. 4. As shown in FIG. 2, FIG. 3 and FIG. 4, the searching regions respectively configured to search for the blocks A, B, C and D may overlap one another.

Figure 5:
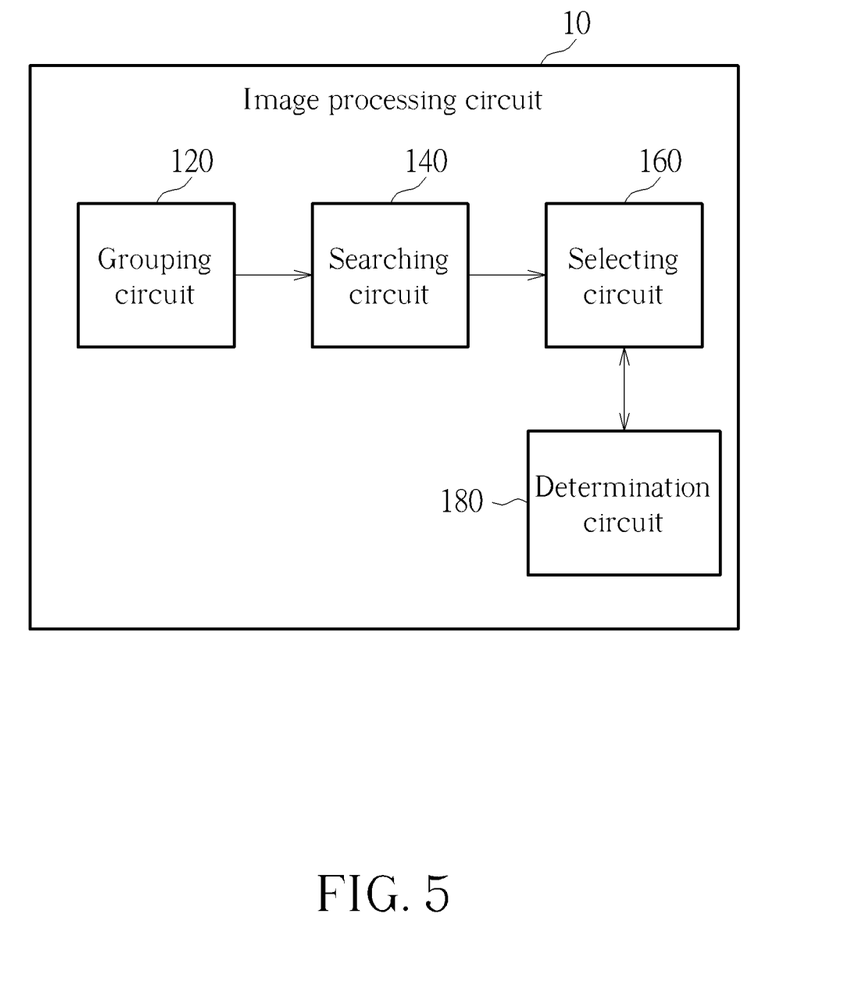
FIG. 5 is a diagram illustrating an image processing circuit for performing searching operations regarding an image according to an embodiment of the present invention.
Figure 6:
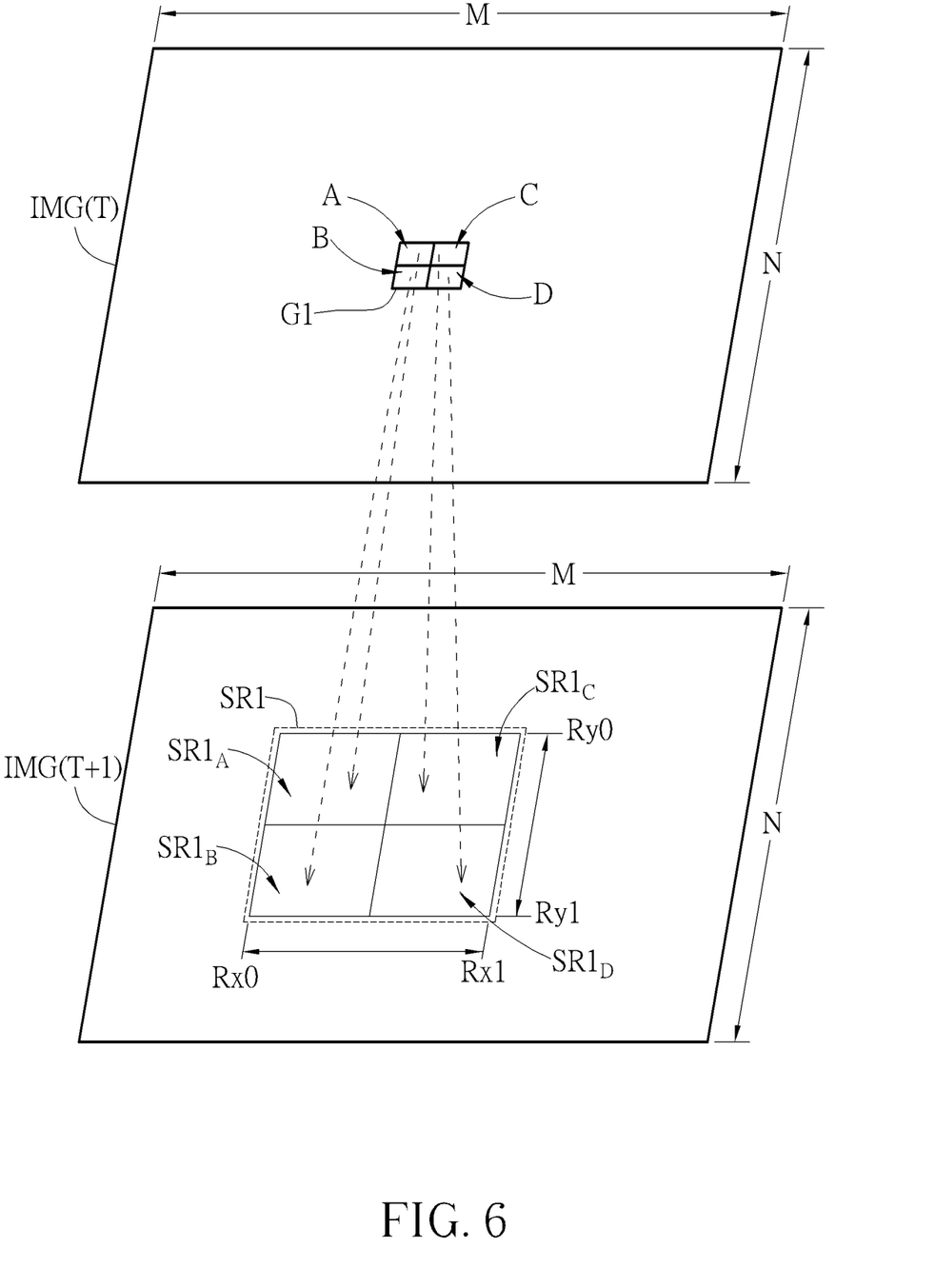
FIG. 6 is a diagram illustrating searching operations regarding multiple blocks of a group within an image according to an embodiment of the present invention.

FIG. 5 is a diagram illustrating an image processing circuit 10 for performing searching operations regarding an image (e.g. the image IMG(T) shown in FIG. 1 to FIG. 4) according to an embodiment of the present invention, and FIG. 6 is a diagram illustrating searching operations regarding the blocks A, B, C and D within the image IMG(T) according to an embodiment of the present invention, where the image IMG(T) may be an example of the image, and the image(T+1) may be an example of a target image. For example, the image processing circuit 10 may try to find blocks corresponding to certain blocks within the image, e.g. the blocks A, B, C and D within the image IMG(T) in the target image (e.g. the image IMG(T+1)). As shown in FIG. 5, the image processing circuit 10 may comprise a grouping circuit 120, a searching circuit 140 coupled to the grouping circuit 120, and a selecting circuit 160 coupled to the searching circuit 140.

For better comprehension, refer to FIG. 6 in conjunction with FIG. 5. The grouping circuit 120 may be configured to divide the plurality of blocks into a plurality of groups, where a group within the plurality of groups corresponds to a searching region within the target image (e.g. the region covered by the $Rx0^{th}$ column to the $Rx1^{th}$ column of pixels and the $Ry0^{th}$ row to the $Ry1^{th}$ row of pixels in the image IMG(T+1)). The group may comprise $N_B$ reference blocks within the plurality of blocks, and the searching region may comprise $N_B$ sub-regions, where $N_B$ is an integer greater than one. As shown in FIG. 6, $N_B$ is four in this embodiment, and the grouping circuit 120 may perform grouping in units of four blocks, where a group G1 comprising the blocks A, B, C and D may be an example of the group. The region (such as a searching region SR1) covered by the $Rx0^{th}$ column to the $Rx1^{th}$ column of pixels and the $Ry0^{th}$ row to the $Ry1^{th}$ row of pixels in the image IMG(T+1) may be a searching region corresponding to the group G1, and the searching region SR1 may comprise four sub-regions $SR1_A$, $SR1_B$, $SR1_C$ and $SR1_D$ respectively corresponding to the blocks A, B, C and D (e.g. the searching region SR1 may be divided into four sub-regions with a same size/area to act as the sub-regions $SR1_A$, $SR1_B$, $SR1_C$ and $SR1_D$).

In addition, the searching circuit 140 may be configured to search for the $N_B$ reference blocks in the $N_B$ sub-regions, respectively, to generate $N_B$ searching results respectively corresponding to the $N_B$ reference blocks. As shown in FIG. 6, the searching circuit 140 may search for a block A' corresponding to the block A in the sub-region $SR1_A$ (e.g. try to find the block A' corresponding to the block A in the sub-region $SR1_A$), to generate a searching result $R_A$ corresponding to the block A; the searching circuit 140 may search for a block B' corresponding to the block B in the sub-region $SR1_B$ (e.g. try to find the block B' corresponding to the block B in the sub-region $SR1_B$), to generate a searching result $R_B$ corresponding to the block B; the searching circuit 140 may search for a block C' corresponding to the block C in the sub-region $SR1_C$ (e.g. try to find the block C' corresponding to the block C in the sub-region $SR1_C$), to generate a searching result $R_C$ corresponding to the block C; and the searching circuit 140 may search for a block D' corresponding to the block D in the sub-region $SR1_D$ (e.g. try to find the block D' corresponding to the block D in the sub-region $SR1_D$), to generate a searching result $R_D$ corresponding to the block D.

In addition, the selecting circuit 160 may be configured to select a searching result from the $N_B$ searching results according to $N_B$ matching indicators respectively corresponding to the $N_B$ searching results, for utilizing the searching result to represent a portion or all of the $N_B$ searching results. More particularly, the $N_B$ searching results may indicate $N_B$ target blocks corresponding to the $N_B$ reference blocks in the $N_B$ sub-regions, respectively, and the $N_B$ matching indicators indicate degrees of matching of the $N_B$ target blocks relative to the $N_B$ reference blocks, respectively. For example, the searching result $R_A$ may indicate the block A' corresponding to the block A in the sub-region $SR1_A$ (e.g. a position of the block A' in the image IMG(T+1)), and a matching indicator corresponding to the searching result $R_A$ may indicate a degree of matching (e.g. similarity) of the block A' relative to the block A; the searching result $R_B$ may indicate the block B' corresponding to the block B in the sub-region $SR1_B$ (e.g. a position of the block B' in the image IMG(T+1)), and a matching indicator corresponding to the searching result $R_B$ may indicate a degree of matching (e.g. similarity) of the block B' relative to the block B; the searching result $R_C$ may indicate the block C' corresponding to the block C in the sub-region $SR1_C$ (e.g. a position of the block C' in the image IMG(T+1)), and a matching indicator corresponding to the searching result $R_C$ may indicate a degree of matching (e.g. similarity) of the block C' relative to the block C; and the searching result $R_D$ may indicate the block D' corresponding to the block D in the sub-region $SR1_D$ (e.g. a position of the block D' in the image IMG(T+1)), and a matching indicator corresponding to the searching result $R_D$ may indicate a degree of matching (e.g. similarity) of the block D' relative to the block D. The above degrees of matching or similarity may be calculated by a sum of absolute differences (SADs), but the present invention is not limited thereto.

Under a condition where the blocks A, B, C and D belong to a same object, when a searching result corresponding to a certain block (e.g. the block A) has the greatest matching indicator (e.g. the highest degree of matching) in comparison with other searching results, this searching result (e.g. the searching result $R_A$) may also be configured to represent searching results corresponding to other blocks (e.g. the blocks B, C and D) within this group, e.g. utilizing the searching result $R_A$ to be an overall searching result corresponding to this group (e.g. the blocks A, B, C and D may share a same motion vector). As a result, the searching operations regarding the blocks A, B, C and D originally requiring a total of K×4 comparison operations can be reduced to a total of K comparison operations under operations of the image processing circuit 10. Under a condition where any one of the blocks A, B, C and D belongs to a different object than the other three blocks (e.g. a condition where the block A belongs to a certain object, and the blocks B, C and D belong to another object), none of the searching results $R_A$, $R_B$, $R_C$ and $R_D$ should be selected for representing the overall searching result corresponding to this group. Thus, the image processing circuit 10 may further comprise a determination circuit 180 configured to determine whether the $N_B$ target blocks belong to a same object, to generate a determination result, and decide whether to utilize the searching result for representing all of the $N_B$ searching results according to the determination result, where the determination circuit 180 may be coupled to the selecting circuit 160. More particularly, when the determination result indicates that the $N_B$ target blocks belong to the same object, the determination circuit may utilize the searching result (e.g. the aforementioned searching result with the greatest matching indicator) for representing all of the $N_B$ searching results; and when the determination result indicates that one or more target blocks within the $N_B$ target blocks and a target block corresponding to the searching result belong to different objects, the determination circuit 180 may prevent utilizing the searching result (e.g. the aforementioned searching result with the greatest matching indicator) for representing one or more searching results corresponding to the one or more target blocks.

Assume that the searching result $R_A$ corresponding to the block A has the greatest matching indicator in comparison with other searching results (such as the searching results $R_B$, $R_C$ and $R_D$). If the determination circuit 180 determines that the block A, B, C and D belong to the same object, the determination circuit 180 may utilize the searching result $R_A$ for representing the searching results corresponding to the blocks B, C and D, e.g. utilizing the searching result $R_A$ to be the overall searching result corresponding to this group, and the blocks A, B, C and D may share the same motion vector under this condition. If the determination circuit 180 determines that any one of the blocks A, B, C and D belongs to a different object from the other three blocks (e.g. a condition where the block A belongs to a certain object, and the blocks B, C and D belong to another object), the determination circuit 180 may prevent utilizing the searching result $R_A$ for representing the searching results corresponding to the blocks B, C and D. For example, the determination circuit 180 may select the searching result having the greatest matching indicator among the searching results $R_B$, $R_C$ and $R_D$ for representing the searching results corresponding to the blocks B, C and D, where under this condition, the block A may correspond to a certain motion vector and the blocks B, C and D may correspond to another motion vector.

In addition, the determination circuit 180 may compare each block of the blocks A, B, C and D with surrounding blocks thereof according to brightness information, color/chroma information or texture information to determine similarities between them, in order to confirm whether the blocks A, B, C and D belong to the same object. It should be noted that the manner of determining whether the blocks A, B, C and D belong to the same object is not limited to specific determination mechanisms, and any determination mechanism that can effectively determine whether the blocks A, B, C and D belong to the same object should belong to the scope of the present invention.

Figure 7:
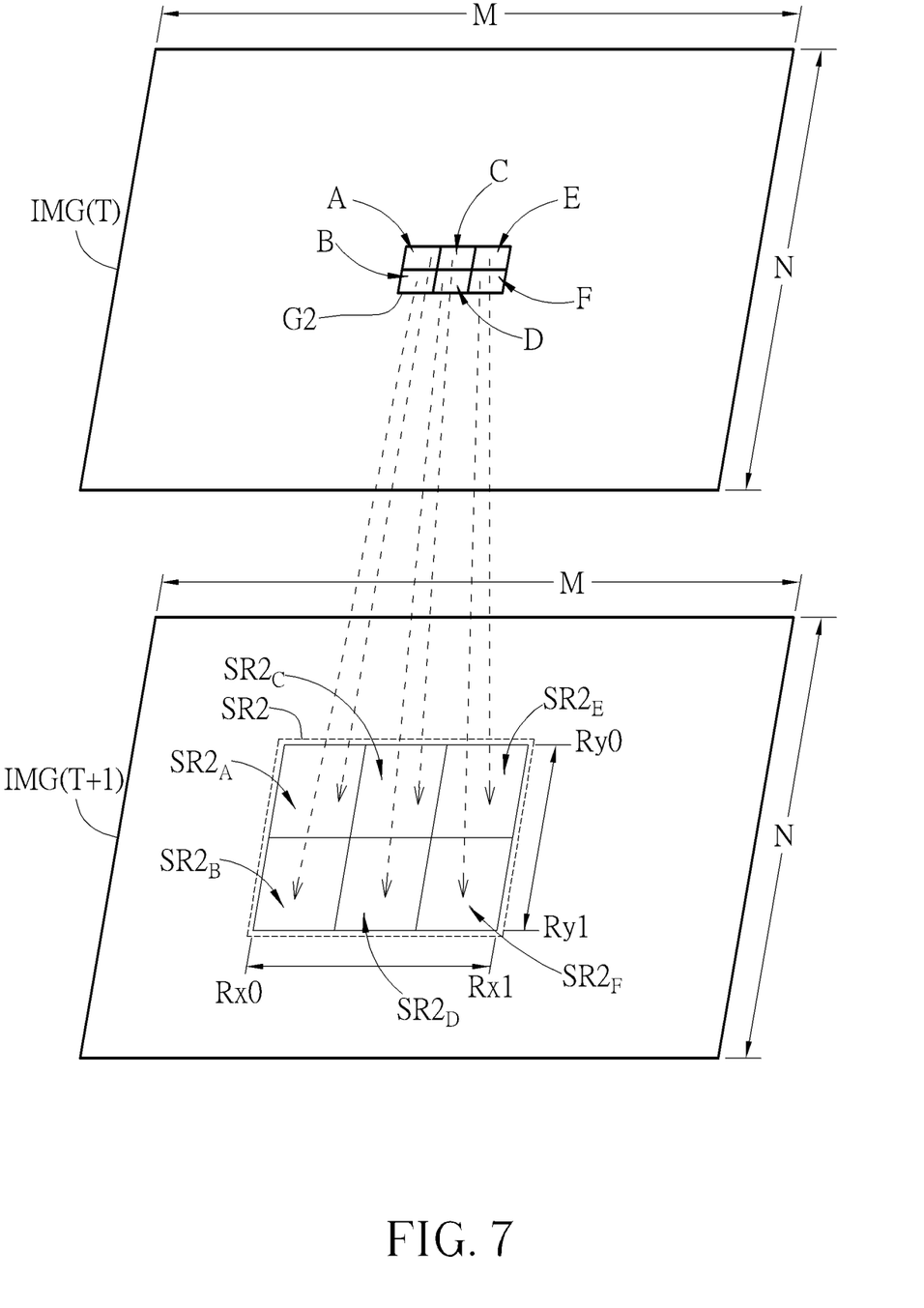
FIG. 7 is a diagram illustrating searching operations regarding multiple blocks of a group within an image according to an embodiment of the present invention.

Although the image processing circuit 10 needs to utilize the determination circuit 180 for determining whether multiple blocks within a certain group belong to a same object, in comparison with the number of comparison operations required in the embodiments of FIG. 1 to FIG. 4, the embodiments of FIG. 5 and FIG. 6 still can effectively reduce the required calculation amount (more particularly, a count of overall comparison operations). In addition, the value of $N_B$ mentioned in the above embodiments is not limited to a specific value, where the greater the $N_B$, the less the overall searching count for the target image (e.g. the image IMG(T+1)). FIG. 7 is a diagram illustrating searching operations regarding blocks A, B, C, D, E and F within the image IMG(T) according to an embodiment of the present invention, where the image IMG(T) may be an example of the image, and the image IMG(T+1) may be an example of the target image. As shown in FIG. 7, $N_B$ is six in this embodiment, and the grouping circuit 10 may perform grouping in units of six blocks, where a group G2 comprising the blocks A, B, C, D, E and F may be an example of the group. The region (such as a searching region SR2) covered by the Rx$0^{th}$ column to the Rx$1^{th}$ column of pixels and the Ry$0^{th}$ row to the Ry$1^{th}$ row of pixels in the image IMG(T+1) may be a searching region corresponding to the group G2, and the searching region SR2 may comprise six sub-regions $SR2_A$, $SR2_B$, $SR2_C$, $SR2_D$, $SR2_E$ and $SR2_F$ respectively corresponding to the blocks A, B, C, D, E and F (e.g. the searching region SR2 may be divided into six sub-regions with a same size/area to act as the sub-regions $SR2_A$, $SR2_B$, $SR2_C$, $SR2_D$, $SR2_E$ and $SR2_F$). For better comprehension, similar descriptions of the aforementioned embodiments are not repeated here for brevity. In comparison with the embodiment shown in FIG. 6, the number of comparison operations required by the searching operations regarding the whole image in this embodiment is further reduced. If the operations of determining whether multiple blocks within a single group belong to a same object are omitted, the number of comparison operations required by the searching operations regarding the whole image may be expressed as M×N×K/NB, but the present invention is not limited thereto.

Figure 8:
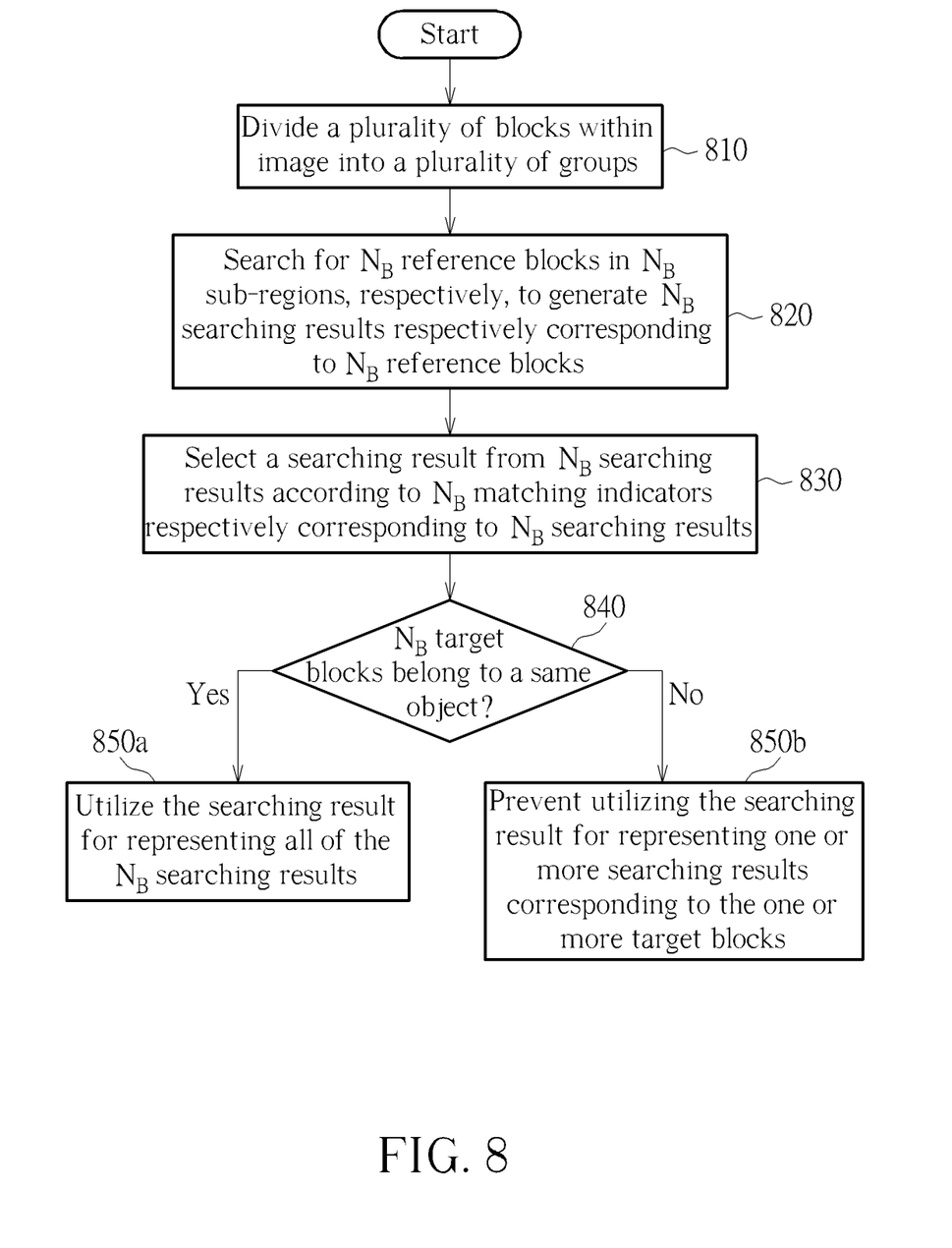
FIG. 8 is a diagram illustrating a working flow of a method for performing searching operations regarding an image according to an embodiment of the present invention.

FIG. 8 is a diagram illustrating a working flow of a method for performing searching operations regarding an image (e.g. the image IMG(T)) according to an embodiment of the present invention. If a same result may be obtained, one or more steps shown in FIG. 8 may be added, deleted or modified in the working flow, and the one or more steps do not have to be executed in the exact order shown in FIG. 8. In addition, the working flow shown in FIG. 8 may be executed by the image processing circuit 10 shown in FIG. 5, but the present invention is not limited thereto.

In Step 810, the grouping circuit 120 of the image processing circuit 10 may divide a plurality of blocks within the image into a plurality of groups, where a group within the plurality of groups corresponds to a searching region within a target image, the group comprises $N_B$ reference blocks within the plurality of blocks, and the searching region comprises $N_B$ sub-regions.

In Step 820, the searching circuit 140 of the image processing circuit 10 may search for the $N_B$ reference blocks in the $N_B$ sub-regions, respectively, to generate $N_B$ searching results respectively corresponding to the $N_B$ reference blocks.

In Step 830, the selecting circuit 160 of the image processing circuit 10 may select a searching result from the $N_B$ searching results according to $N_B$ matching indicators respectively corresponding to the $N_B$ searching results, for utilizing the searching result to represent a portion or all of the $N_B$ searching results.

In Step 840, the determination circuit 180 of the image processing circuit 10 may determine whether the $N_B$ target blocks belong to a same object, to generate a determination result, and decide whether to utilize the searching result for representing all of the $N_B$ searching results according to the determination result. If the determination result indicates that the $N_B$ target blocks belong to the same object, the working flow enters Step 850a; otherwise (e.g. the determination result indicates that one or more target blocks within the $N_B$ target blocks and a target block corresponding to the searching result belong to different objects), the working flow enters Step 850b.

In Step 850a, the determination circuit 180 may utilize the searching result for representing all of the $N_B$ searching results.

In Step 850b, the determination circuit 180 may prevent utilizing the searching result for representing one or more searching results corresponding to the one or more target blocks.

In addition, one or more of the grouping circuit 120, the searching circuit 140, the selecting circuit 160 and the determination circuit 180 within the image processing circuit 10 may be integrated as a module circuit, or any of the grouping circuit 120, the searching circuit 140, the selecting circuit 160 and the determination circuit 180 may comprise multiple sub-circuits. Furthermore, the coupling of the grouping circuit 120, the searching circuit 140, the selecting circuit 160 and the determination circuit 180 may vary. Any apparatus that can execute the working flow shown in FIG. 8 should belong to the scope of the present invention.

In addition, the image processing circuit 10 shown in FIG. 5 and the working flow shown in FIG. 8 is applicable to searching operations between different frames, as shown in the above embodiments. Under this condition, the image processing circuit 10 shown in FIG. 5 and the working flow shown in FIG. 8 may be configured to perform motion estimation of an object between different frames, but the present invention is not limited thereto. In some embodiments, the image processing circuit 10 shown in FIG. 5 and the working flow shown in FIG. 8 may be applicable to searching operations of a same frame (e.g. a condition where the image and the target image is a same image). Under this condition, the image processing circuit 10 shown in FIG. 5 and the working flow shown in FIG. 8 may be configured to perform operations of foreground/background segmentation regarding an image, but the present invention is not limited thereto.

To summarize, the embodiments of the present invention provide a method and an associated image processing circuit for performing searching operations regarding an image, which can effectively reduce a number of comparison operations regarding a whole image. In comparison with the related art, hardware resources can be effectively saved, and overall calculation amount and calculation time can be effectively reduced. Thus, the present invention can enhance the overall performance of image processing without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing searching operations regarding an image, the image comprising a plurality of blocks, each block within the plurality of blocks comprising a plurality of pixels, the method comprising:
   utilizing a grouping circuit to divide the plurality of blocks into a plurality of groups, wherein a group within the plurality of groups corresponds to a searching region within a target image, the group comprises $N_B$ reference blocks within the plurality of blocks, the searching region comprises $N_B$ sub-regions, and $N_B$ is an integer greater than one;
   utilizing a searching circuit to search for the $N_B$ reference blocks in the $N_B$ sub-regions, respectively, to generate $N_B$ searching results respectively corresponding to the $N_B$ reference blocks; and
   utilizing a selecting circuit to select a searching result from the $N_B$ searching results according to $N_B$ matching indicators respectively corresponding to the $N_B$ searching results, for utilizing the searching result to represent a portion or all of the $N_B$ searching results;
   wherein the $N_B$ searching results indicate $N_B$ target blocks corresponding to the $N_B$ reference blocks in the $N_B$ sub-regions, respectively, and the $N_B$ matching indicators indicate degrees of matching of the $N_B$ target blocks relative to the $N_B$ reference blocks, respectively.

2. The method of claim 1, further comprising:
   utilizing a determination circuit to determine whether the $N_B$ target blocks belong to a same object, to generate a determination result, and deciding whether to utilize the searching result for representing all of the $N_B$ searching results according to the determination result.

3. The method of claim 2, wherein the step of deciding whether to utilize the searching result for representing all of the $N_B$ searching results according to the determination result comprises:

in response to the determination result indicating that the $N_B$ target blocks belong to the same object, utilizing the searching result for representing all of the $N_B$ searching results.

4. The method of claim 2, wherein the step of deciding whether to utilize the searching result for representing all of the $N_B$ searching results according to the determination result comprises:

in response to the determination result indicating that one or more target blocks within the $N_B$ target blocks and a target block corresponding to the searching result belong to different objects, preventing utilizing the searching result for representing one or more searching results corresponding to the one or more target blocks.

5. The method of claim 1, wherein the greater the $N_B$, the fewer the overall number of searching operations for the target image.

6. The method of claim 1, wherein the method is applicable to searching operations of a same image frame.

7. The method of claim 1, wherein the method is applicable to searching operations between different image frames.

8. An image processing circuit for performing searching operations regarding an image, the image comprising a plurality of blocks, each block within the plurality of blocks comprising a plurality of pixels, the image processing circuit comprising:

a grouping circuit, configured to divide the plurality of blocks into a plurality of groups, wherein a group within the plurality of groups corresponds to a searching region within a target image, the group comprises $N_B$ reference blocks within the plurality of blocks, the searching region comprises $N_B$ sub-regions, and $N_B$ is an integer greater than one;

a searching circuit, coupled to the grouping circuit, configured to search for the $N_B$ reference blocks in the $N_B$ sub-regions, respectively, to generate $N_B$ searching results respectively corresponding to the $N_B$ reference blocks; and a selecting circuit, coupled to the searching circuit, configured to select a searching result from the $N_B$ searching results according to $N_B$ matching indicators respectively corresponding to the $N_B$ searching results, for utilizing the searching result to represent a portion or all of the $N_B$ searching results;

wherein the $N_B$ searching results indicate $N_B$ target blocks corresponding to the $N_B$ reference blocks in the $N_B$ sub-regions, respectively, and the $N_B$ matching indicators indicate degrees of matching of the target blocks relative to the $N_B$ reference blocks, respectively.

9. The image processing circuit of claim 8, further comprising:

a determination circuit, coupled to the selecting circuit, configured to determine whether the $N_B$ target blocks belong to a same object, to generate a determination result, and configured to decide whether to utilize the searching result for representing all of the $N_B$ searching results according to the determination result.

10. The image processing circuit of claim 9, wherein in response to the determination result indicating that the $N_B$ target blocks belong to the same object, the determination circuit utilizes the searching result for representing all of the $N_B$ searching results.

11. The image processing circuit of claim 9, wherein in response to the determination result indicating that one or more target blocks within the $N_B$ target blocks and a target block corresponding to the searching result belong to different objects, the determination circuit prevents utilizing the searching result for representing one or more searching results corresponding to the one or more target blocks.

12. The image processing circuit of claim 8, wherein the greater the $N_B$, the fewer the overall number of searching operations for the target image.

13. The image processing circuit of claim 8, wherein the image processing circuit is applicable to searching operations of a same image frame.

14. The image processing circuit of claim 8, wherein the image processing circuit is applicable to searching operations between different image frames.

* * * * *